(12) United States Patent  
Thind et al.

(10) Patent No.: US 7,421,560 B2  
(45) Date of Patent: Sep. 2, 2008

(54) METHOD AND SYSTEM OF COMPUTING QUOTA USAGE

(75) Inventors: Ravinder S. Thind, Kirkland, WA (US); Neal R. Christiansen, Bellevue, WA (US); Vishal V. Ghotge, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 10/999,536

(22) Filed: Nov. 30, 2004

(65) Prior Publication Data

US 2006/0117135 A1    Jun. 1, 2006

(51) Int. Cl.
   *G06F 12/00*    (2006.01)

(52) U.S. Cl. .................... 711/170; 711/100; 707/1; 707/200

(58) Field of Classification Search ................. 711/100, 711/112, 154, 170; 707/1, 100, 200, 205
See application file for complete search history.

(56) References Cited

U.S. PATENT DOCUMENTS 6,832,248 B1 *  12/2004  Byrnes ..................... 709/223
2004/0243699 A1 *  12/2004  Koclanes et al. ........... 709/224

* cited by examiner

*Primary Examiner*—Jasmine Song  
(74) *Attorney, Agent, or Firm*—Workman Nydegger

(57) ABSTRACT

A method and system for computing disk space used by a directory and its descendants that may proceed while input and output are occurring that involve the directory and any of its descendants. A calculation of the total amount of disk space consumed by a set of objects is commenced. While performing the calculation, changes to the objects are monitored. If a change to one or more of the objects affects the disk space consumed by the objects, the calculation is changed so that the total reflects the change to the one or more objects.

28 Claims, 17 Drawing Sheets

FIG. 8

| DELTA FILE TABLE ||
|---|---|
| FILE ID | QUOTA ALREADY CHARGED |
| 1332 | 1 MB |
| 2552 | 15 MB |
| 3113 | 5 MB |
| 9443 | 7 MB |
| 10444 | 125 MB |
| 52232 | 1 KB |
| 75533 | 1 KB |
| 80008 | SKIP |

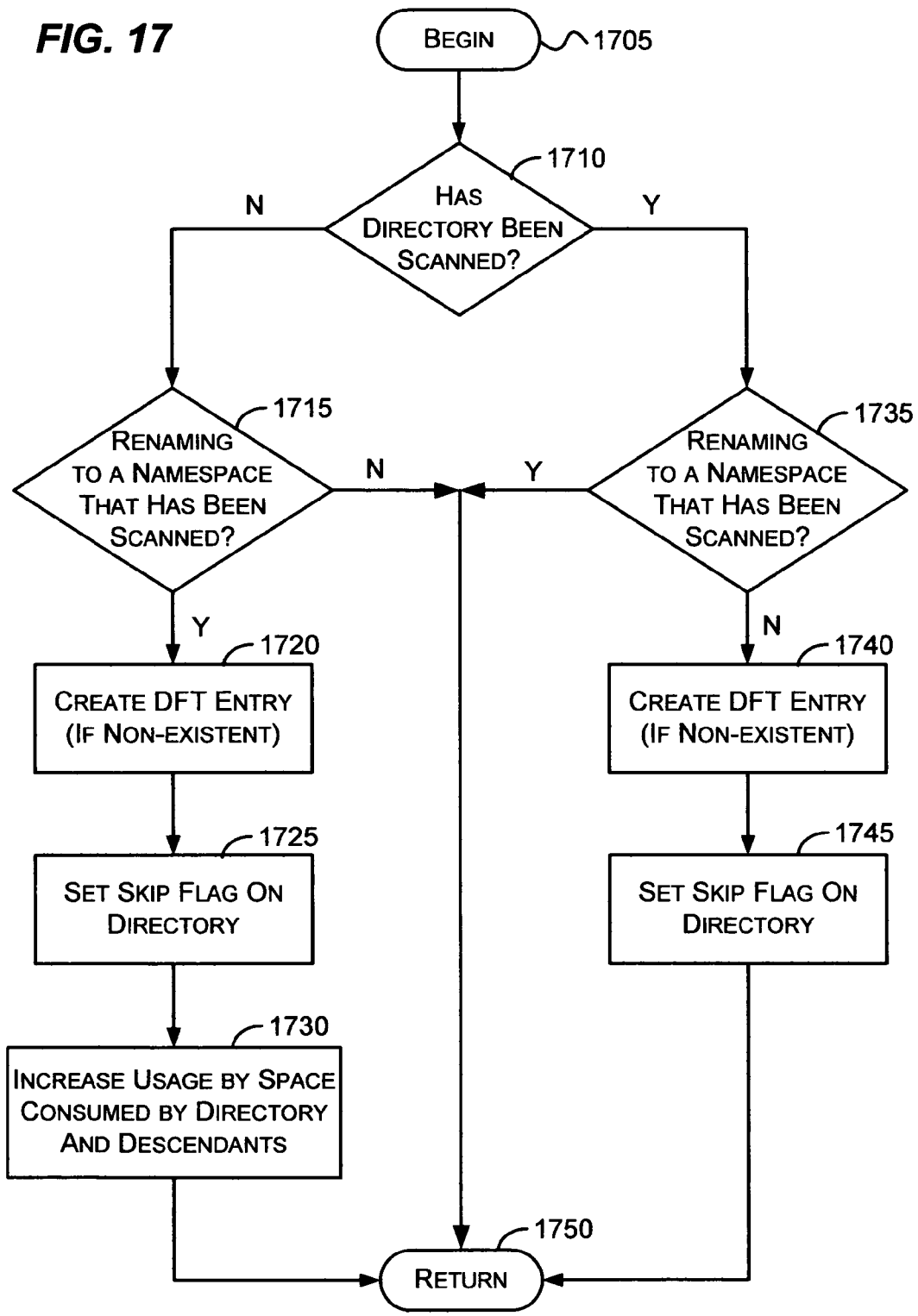

METHOD AND SYSTEM OF COMPUTING QUOTA USAGE

FIELD OF THE INVENTION

The invention relates generally to computers, and more particularly to file systems.

BACKGROUND

System administrators are often tasked with managing disk usage. To do so, a system administrator may apply quotas on certain directories of various volumes of a file system. A directory upon which a quota is applied may include millions of descendants. Determining the disk space consumed by these descendants so that a quota may be enforced on the directory may take hours or days. The system administrator, however, often does not have days or even hours to wait for a quota to be applied to a directory. Furthermore, locking users and processes out of the directory while the space consumed by the directory and its descendants is computed may halt the productivity of an entire company.

What is needed is a method and system of computing the disk space used by a directory and its descendants that may proceed while input and output are occurring that involve the directory and any of its descendants.

SUMMARY

Briefly, the present invention provides a method and system for computing disk space used by a directory and its descendants that may proceed while input and output are occurring that involve the directory and any of its descendants. A calculation of the total amount of disk space consumed by a set of objects is commenced. While performing the calculation, changes to the objects are monitored. If a change to one or more of the objects affects the disk space consumed by the objects, the calculation is changed so that the total reflects the change to the one or more objects.

In one aspect, a data structure such as a table is updated each time a change affects the disk space consumed by the objects. The table includes an entry for each object that has changed since the calculation began. Each entry includes a file identifier that identifies the object that has been changed and a value that indicates how much of the disk space consumed by the object has already been accounted for in the calculation. When the calculation involves an object for which an entry exists, the disk space already accounted for is used in determining how much to add to the total.

Other aspects will become apparent from the following detailed description when taken in conjunction with the drawings, in which:

BRIEF DESCRIPTION OF THE DRAWINGS

FIG. 8 is a diagram that generally represents an exemplary delta file table in accordance with various aspects of the invention;

FIG. 17 is a flow diagram that generally represents actions which correspond to block 1520 of FIG. 15 that may occur when a rename I/O occurs that involves a directory in accordance with various aspects of the invention.

DETAILED DESCRIPTION

Exemplary Operating Environment

Figure 1:
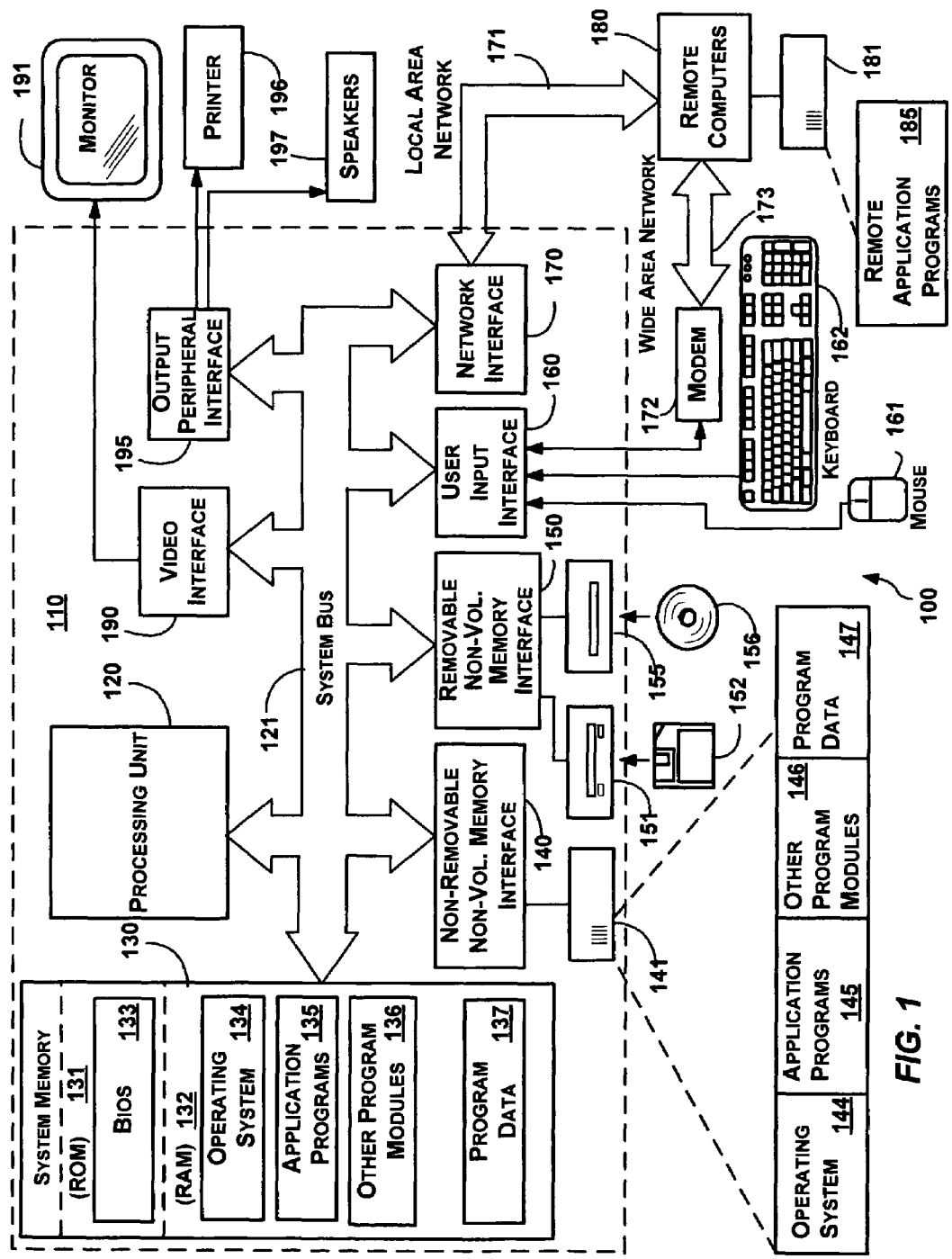
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer

180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Filters and Arrangements Thereof

Microsoft Corporation's Windows® XP operating system with an underlying file system such as the Windows® NTFS (Windows® NT File System), FAT, CDFS, SMB redirector file system, or WebDav file systems, one or more file system filter drivers may be inserted between the I/O manager that receives user I/O requests and the file system driver. In general, filter drivers (sometimes referred to herein simply as "filters") are processes or components that enhance the underlying file system by performing various file-related computing tasks that users desire, including tasks such as passing file system I/O (requests and data) through anti-virus software, file system quota providers, file replicators, and encryption/compression products.

For example, antivirus products provide a filter that watches I/O to and from certain file types (.exe, .doc, and the like) looking for virus signatures, while file replication products perform file system-level mirroring. Other types of file system filter drivers are directed to system restoration (which backs up system files when changes are about to be made so that the user can return to the original state), disk quota enforcement, backup of open files, undeletion of deleted files, encryption of files, and so forth. Thus, by installing file system filter drivers, computer users can select the file system features they want and need, in a manner that enables upgrades, replacement, insertion, and removal of the components without changing the actual operating system or file system driver code.

Figure 2:
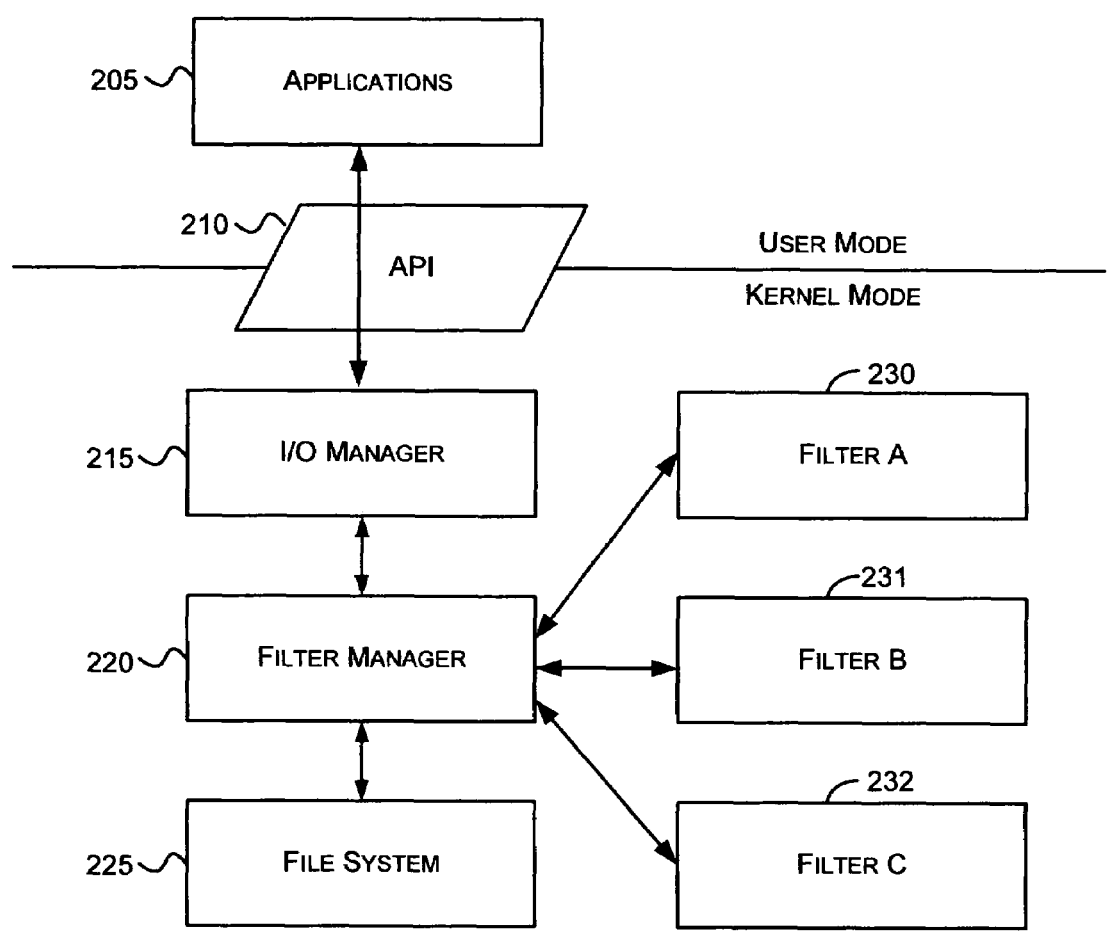
FIG. 2 is a block diagram representing an exemplary arrangement of components of a system in which the present invention may operate in accordance with various aspects of the invention.

FIG. 2 is a block diagram representing an exemplary arrangement of components of a system in which the present invention may operate in accordance with various aspects of the invention. The components include one or more applications 205, an applications programming interface (API) 210, an input/output (I/O) manager 215, a filter manger 220, a file system 225, and one or more filters 230-232.

The applications 205 may make file system requests (e.g., via function/method calls) through the API 210 to the I/O manager 215. The I/O manager 215 may determine what I/O request or requests should be issued to fulfill each request and send each I/O request to the filter manager 220. The I/O manager 210 may also return data to the applications 205 as operations associated with the file system requests proceed, complete, or abort.

In one implementation, filters comprise objects or the like that when instantiated register (e.g., during their initialization procedure) with a registration mechanism in the filter manager 220. For efficiency, each filter typically will only register for file system requests in which it may be interested in processing. To this end, as part of registration, each filter notifies the filter manager 220 of the types of I/O requests in which it is interested (e.g., create, read, write, close, rename, and so forth). For example, an encryption filter may register for read and write I/Os, but not for others wherein data does not need to be encrypted or decrypted. Similarly, a quota filter may be interested only in object creates and object writes.

In addition to specifying the types of I/O requests in which it is interested, a filter may further specify whether the filter should be notified for pre-callbacks and post callbacks for each of the types of I/O. A pre-callback is called as data associated with an I/O request propagates from the I/O manager 215 towards the file system 225, while a post-callback is called during the completion of the I/O request as data associated with the I/O request propagates from the file system 225 towards the I/O manager 215.

From each I/O request, the filter manager 220 may create a data structure in a uniform format suitable for use by the filters 230-232. Hereinafter, this data structure is sometimes referred to as callback data. The filter manager 220 may then call and pass the callback data to each filter that has registered to receive callbacks for the type of I/O received by the filter manager 220. Any filters registered to receive callbacks for the type of I/Os received by the filter manager are sometimes referred to as registered filters.

Typically, the filter manager 220 passes callback data associated with a particular type of I/O request to each registered filter sequentially in an order in which the registered filters are ordered. For example, if the filters 230 and 232 are registered to receive callbacks for all read I/O requests and are ordered such that the filter 230 is before the filter 232 in processing such requests, then after receiving a read I/O, the filter manager 220 may first call and pass the callback data to the filter 230 and after the filter 230 has processed the callback data, the filter manager 220 may then call and pass the callback data (as modified, if at all) to the filter 232.

A filter may be attached to one or more volumes. That is, a filter may be registered to be called and receive callback data for I/Os related to only one or more than one volumes.

A filter may generate its own I/O request which may then be passed to other filters. For example, an anti-virus filter may wish to read a file before it is opened. A filter may stop an I/O request from propagating further and may instruct the filter manager to report a status code (e.g., success or failure) for the I/O request. A filter may store data in memory and persist (e.g., store) this data on disk. In general, a filter may be created to perform any set of actions that may be performed by a kernel-mode or user-mode process and may be reactive (e.g., wait until it receives I/O requests before acting) and/or proactive (e.g., initiate its own I/O requests or perform other actions asynchronously with I/O requests handled by the I/O manager 215).

Figure 3:
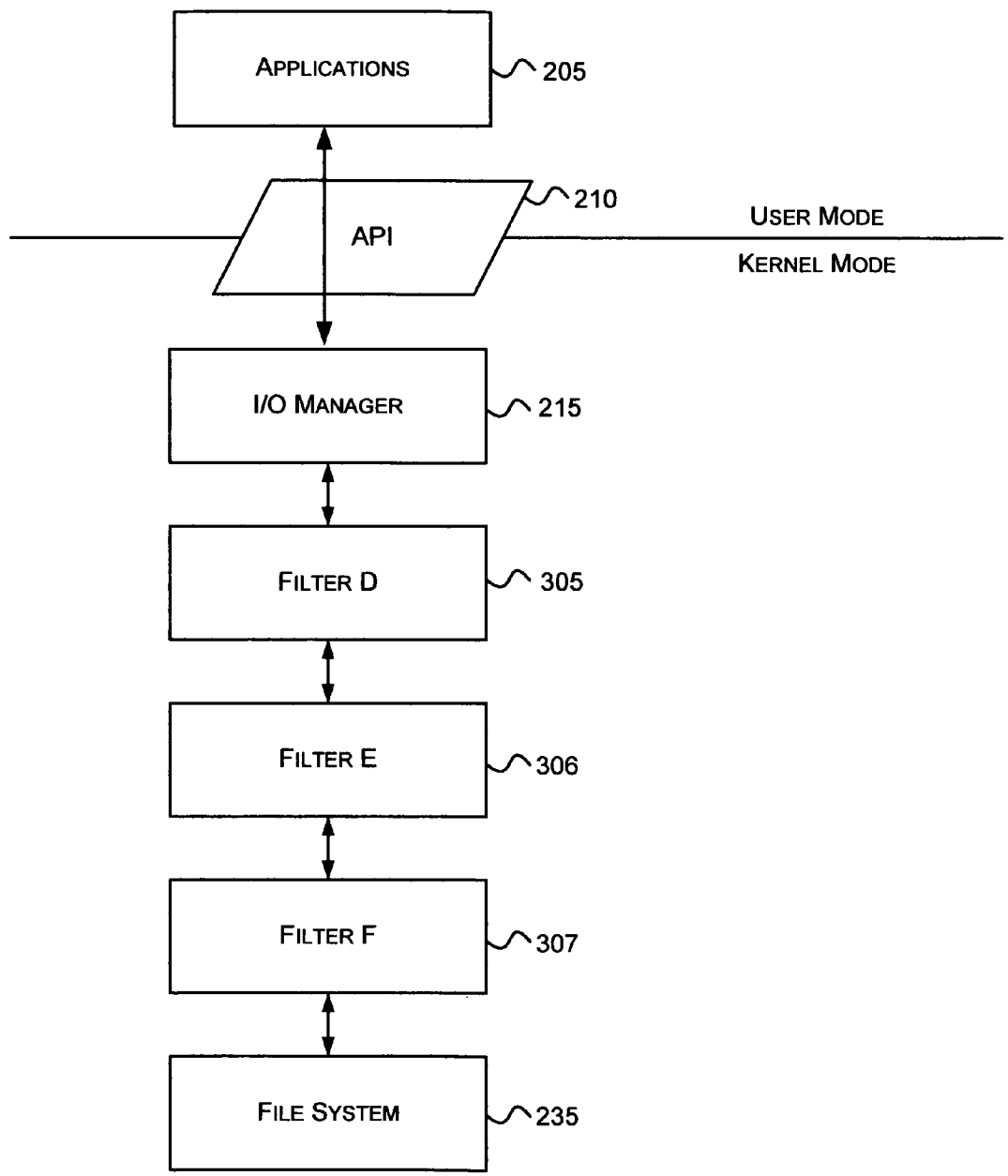
FIG. 3 is a block diagram representing another exemplary arrangement of components of a system in which the present invention may operate in accordance with various aspects of the invention.

In one embodiment, filters may be arranged in a stacked manner as illustrated in FIG. 3, which is a block diagram representing another exemplary arrangement of components of a system in which the present invention may operate in accordance with various aspects of the invention. In this embodiment, each of the filters 305-307 may process I/O requests and pass the requests (modified or unmodified) to another filter or other component in the stack. For example, in response to a read request received from one of the applications 205, the I/O manager 215 may issue an I/O request and send this request to the filter 305. The filter 305 may examine the I/O request and determine that the filter 305 is not interested in the I/O request and then pass the I/O request unchanged to the filter 306. The filter 306 may determine that the filter 306 will perform some action based on the I/O request and may then pass the I/O request (changed or unchanged) to the filter 307. The filter 307 may determine that the filter 307 is not interested in the I/O request and pass the I/O request to the file system 235.

After the file system 235 services the I/O request, it passes the results to the filter 307. Typically, the results pass in an order reverse from that in which the I/O request proceeded (e.g., first to filter 307, then to filter 306, and then to filter 305). Each of the filters 305-307 may examine the results, determine whether the filter is interested in the results, and may perform actions based thereon before passing the results (changed or unchanged) on to another filter or component.

Figure 4:
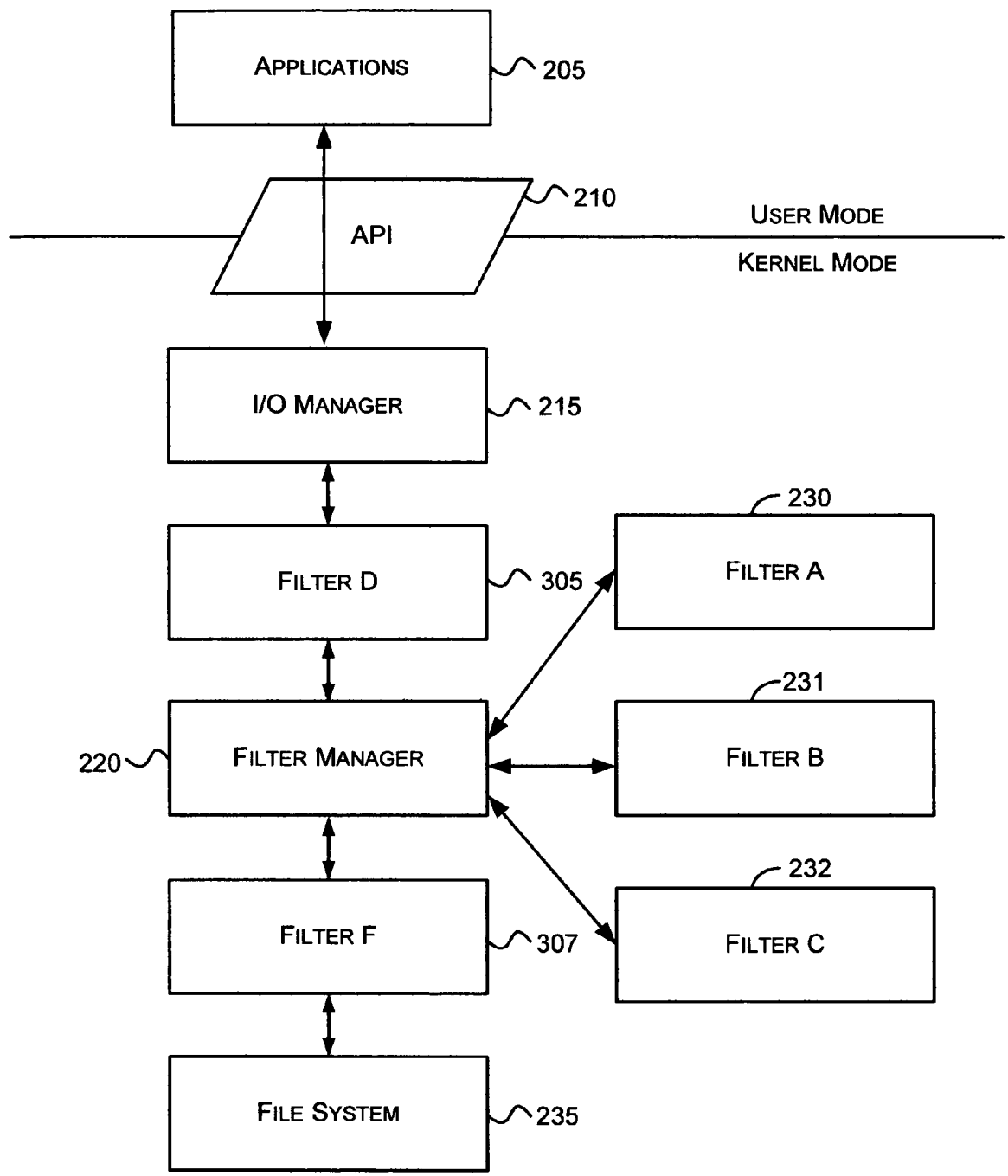
FIG. 4 is a block diagram representing another exemplary arrangement of components of a system in which the present invention may operate in accordance with various aspects of the invention.

In another embodiment of the invention, filters may be arranged in a stacked/managed manner as illustrated in FIG. 4, which is a block diagram representing another exemplary arrangement of components of a system in which the present invention may operate in accordance with various aspects of the invention. In this configuration, some filters are associated with a filter manager while other filters are not. The filter manager 220 is placed in a stack with other filters (e.g., filters 305 and 307).

It will be readily recognized that filters may be implemented in many other configurations without departing from the spirit or scope of the invention. In some embodiments, a filter comprises any object that examines I/O between an application and a file system and that is capable of changing, completing, or aborting the I/O or performing other actions based thereon. Such filters may execute in user mode or in kernel mode and may be part of other components.

Returning to FIG. 2, the file system 235 may include one or more volumes that may be located locally or remotely to the machine or machines upon which the applications 205 execute.

Calculating Quota Usage

Figure 5:
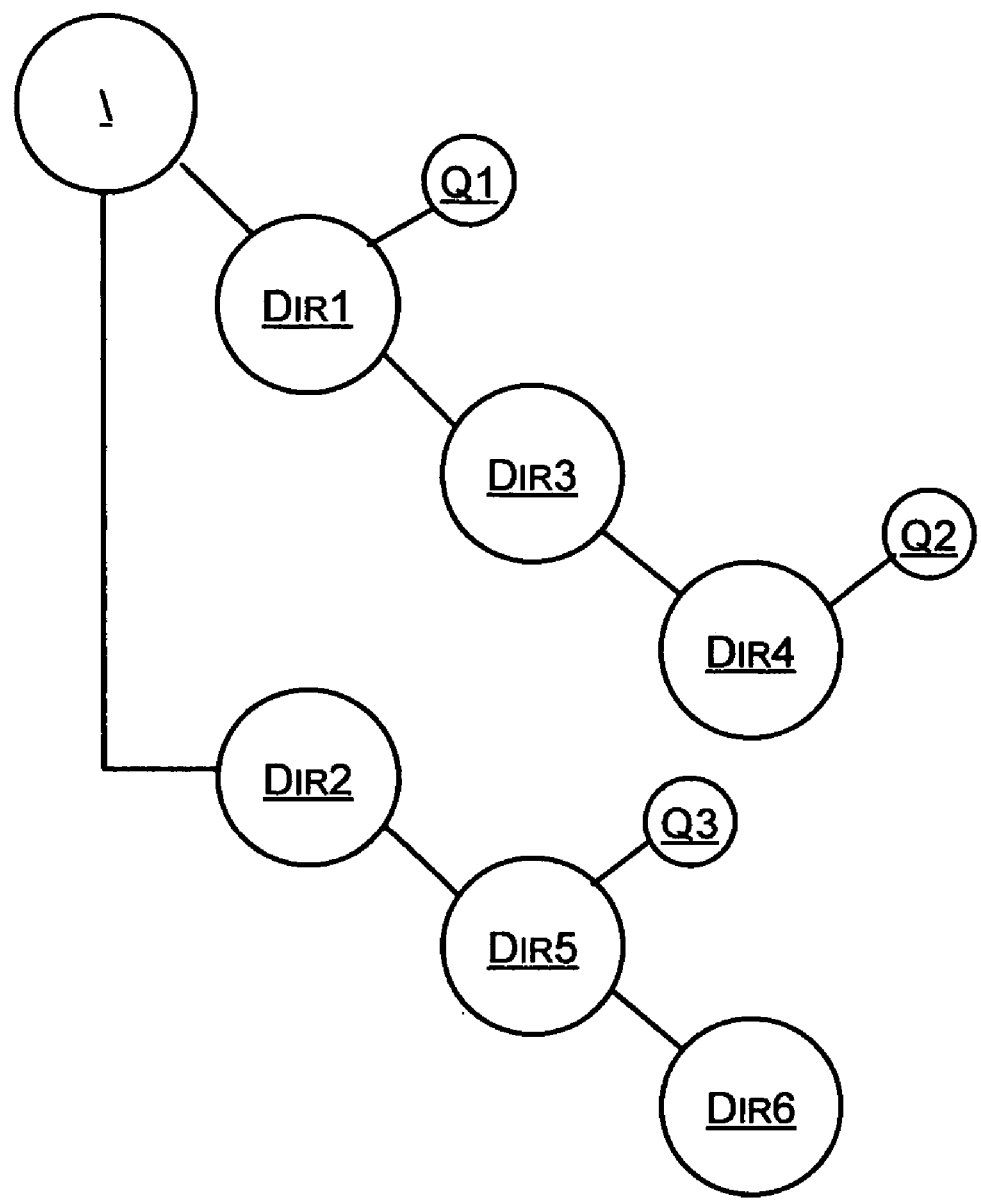
FIG. 5 is a block diagram generally representing a portion of a directory structure of an exemplary file system with which the present invention may be practiced in accordance with various aspects of the invention.

FIG. 5 is a block diagram generally representing a portion of a directory structure of an exemplary file system with which the present invention may be practiced in accordance with various aspects of the invention. The directory structure includes a root directory which has subdirectories Dir1 and Dir2. The directory Dir1 has a subdirectory Dir3 which has a subdirectory Dir4. The directory Dir2 has a subdirectory Dir5 which has a subdirectory Dir6. Other directories and files (not shown) may also be included in the above directories.

Quotas Q1, Q2, and Q3 have been applied to subdirectories Dir1, Dir4, and Dir5, respectively. A quota may involve a directory and its descendants. A descendant of a directory includes any subdirectories and files in the directory, subdirectories and files in those subdirectories, and so forth.

A quota may include various attributes. Some exemplary quota attributes include amount of disk space permitted to be consumed by a directory and all of its descendants (sometimes referred to as a quota limit), amount of disk space currently consumed by the directory and all of its descendants, thresholds, a high water mark that maintains the highest quota value charged, a high water time that indicates that last time the high water mark was updated, a last configuration time that indicates when the quota attributes were last modified, a quota tag that comprises a user-defined string that is associated with the quota, and the like. It will be recognized, however, that fewer, more, or other quota attributes may be included in a quota without departing from the spirit or scope of the present invention.

Figure 6:
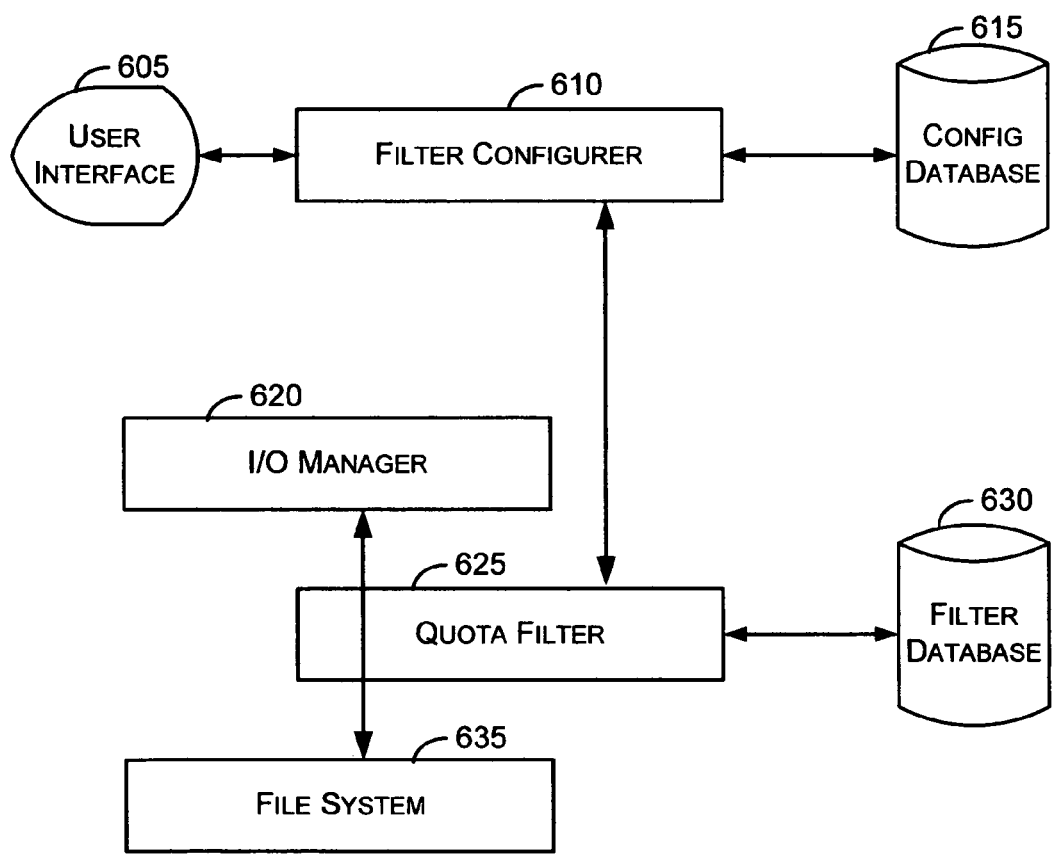
FIG. 6 is a block diagram representing another exemplary arrangement of components that may be used to interact with a quota filter in accordance with various aspects of the invention.

FIG. 6 is a block diagram representing another exemplary arrangement of components that may be used to interact with a quota filter in accordance with various aspects of the invention. The components may include a user interface 605, a filter configurer 610, a configuration database 615, an I/O manager 620, a quota filter 625, a filter database 630, and a file system 635.

An administrator or the like may use the user interface 605 to interact with the filter configurer 610 to apply, delete, query, and configure quotas on one or more directories of the file system 635. Configuration data regarding the quotas may be persisted in a configuration database 615.

The quota filter 625 is a filter that is in charge of enforcing quotas for each applied quota. When an I/O operation would cause a quota limit to be exceeded, the quota filter 625 may fail the operation and/or provide notification that the operation did or would have caused the quota limit to be exceeded. The quota filter 625 may also provide notification when thresholds are crossed and may also perform a variety of other actions related to enforcing and maintaining filters without departing from the spirit or scope of the present invention.

The filter database 630 may include quota attributes for each quota a filter enforces. The filter database 630 may be persisted on disk and read each time the quota filter 625 initializes.

Figure 7:
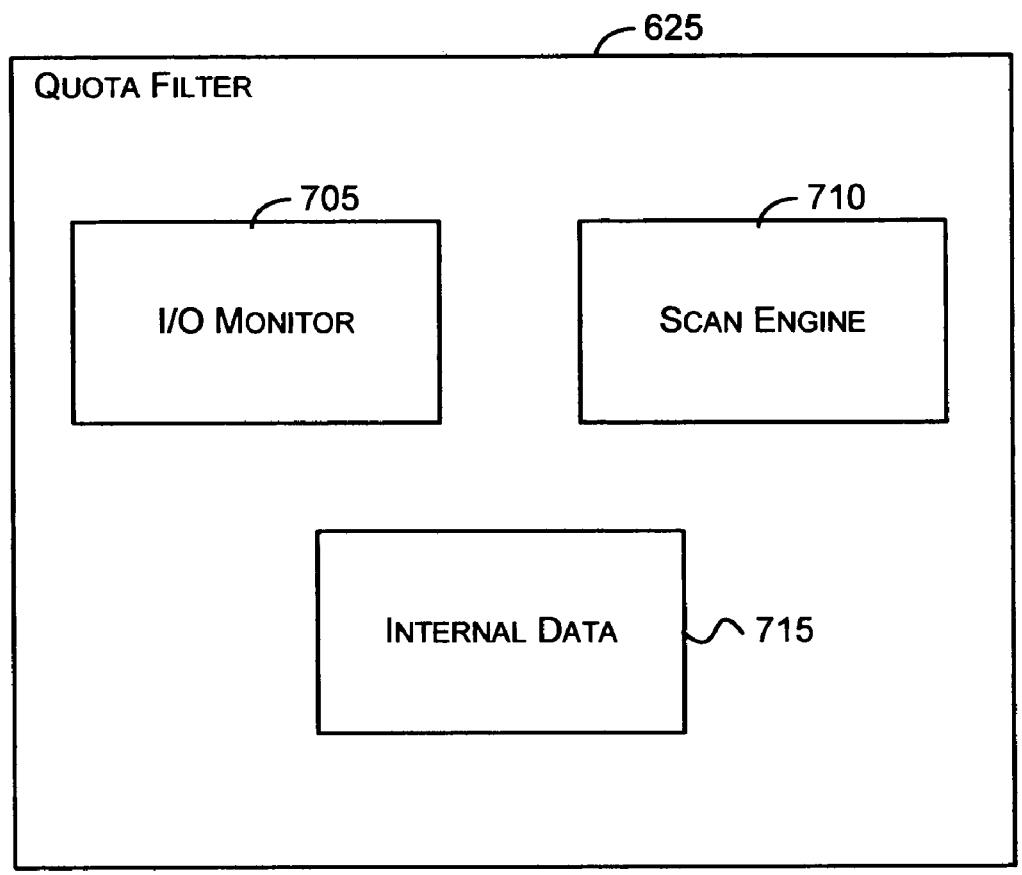
FIG. 7 is a block diagram that generally represents some exemplary components of a quota filter arranged to operate in accordance with various aspects of the invention.

FIG. 7 is a block diagram that generally represents some exemplary components of a quota filter arranged to operate in accordance with various aspects of the invention. The quota filter 625 includes an I/O monitor 705, a scan engine 710, and internal data 715 and may also include other components (not shown).

When a quota is initially applied to a directory the quota filter may cause the scan engine 710 to compute the quota usage for the directory. Before starting the scan, the quota usage of the quota may be set to zero. The scan engine 710 then opens the directory and each of its descendants to compute the quota usage for the directory. The amount of disk space currently consumed by a directory and all its descendants is sometimes referred to as the quota usage for the directory or simply as the quota usage.

When the scan engine 710 begins computing the quota usage, it sets a flag associated with the quota that indicates that the quota usage is being recomputed. In addition a delta file table is created. FIG. 8 is a diagram that generally represents an exemplary delta file table in accordance with various aspects of the invention.

The delta file table includes an entry for each object that has been changed since the scan engine 710 began computing the quota usage for the directory. An entry may include a file ID which may be used to identify the object and the quota that has already been charged to the quota usage for the object. The quota that has already been charged to the quota usage for the object is sometimes referred to as quota that has been accounted for in the quota usage. Quota may have already been charged to the quota usage for an object if, for example, the object was extended, truncated, created, or renamed during scanning. Instead of, in addition to, or using the quota already charged field, an entry may include an indication (e.g., a flag) that the object should be skipped if the scan engine 710 encounters the object during scanning.

The delta file table may be implemented as a binary tree (e.g., indexed by file ID), a table, a database, or as another data structure without departing from the spirit or scope of the present invention.

The scan engine 710 may proceed asynchronously to other actions that are performed by the quota filter 625. For example, the quota filter 625 may monitor I/Os and enforce quotas while the scan engine 710 calculates quota usage.

The internal data 715 may include the delta file table, an indication of the last scanned object, and other data relevant to computing quota usage. As will be seen below, the internal data 715 may be accessed by the scan engine 710 as it computes quota usage and by other components of the quota filter 625 as I/O is monitored.

Figure 9:
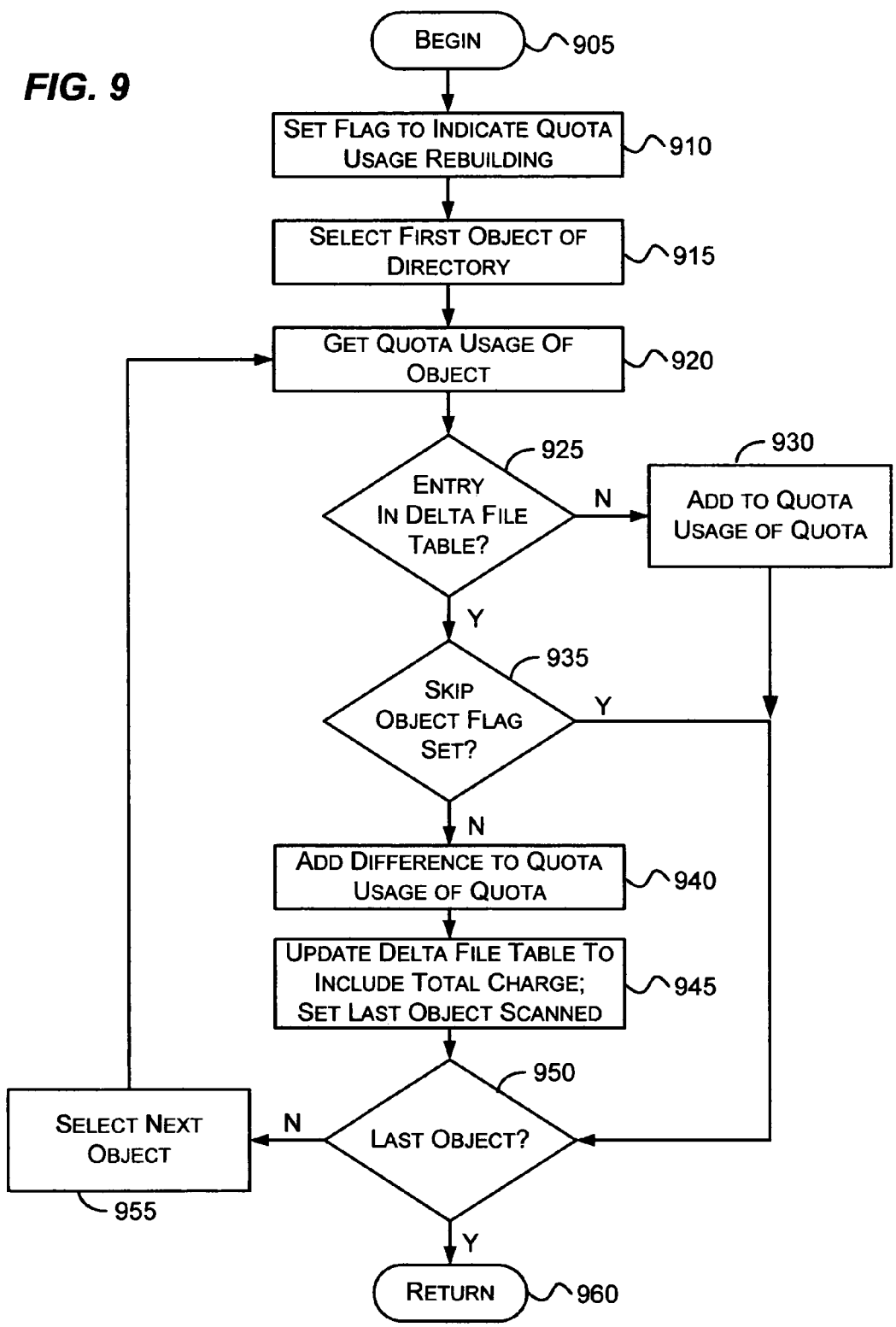
FIG. 9 is a flow diagram that generally represents actions that a scan engine may perform while scanning objects to compute a quota usage in accordance with various aspects of the invention.

FIG. 9 is a flow diagram that generally represents actions that a scan engine may perform while scanning objects to compute a quota usage in accordance with various aspects of the invention. At block 905, the process begins.

At block 910, a flag is set to indicate that the quota usage for a quota is being recomputed. When this flag is set, the quota filter recognizes that this is happening and may update data used by the scan engine whenever an I/O affects the size of location of an object.

At block 915, the first object of the directory for which the quota usage is being computed is selected. At block 920, the current quota usage of the object (e.g., how much disk space the object currently occupies) is obtained.

At block 925, a determination is made as to whether there is an entry in the delta file table for the object. If so, processing branches to block 930; otherwise, processing branches to block 935. When an entry for an object exists in the delta file table, this indicates that the object has been modified since the scan began.

At block 930, the quota usage of the object is added to the quota usage of the quota. At block 935, a determination is made as to whether a skip flag is set for the object. If so, processing branches to block 950; otherwise, processing branches to block 940. A skip flag may be set, for example, on a directory for which quota usage for the directory and its descendants has already been added to the quota usage of the quota. Skipping a directory, for example, may cause the scan engine to skip all descendants of the directory.

At block 940, the difference between the quota already charged to the quota usage of the quota and the quota usage of the object is added to the quota usage of the quota. For example, if a previous change to the file caused 10 MB to be added to the quota usage of the quota and when scanned the file was 20 MB in size, 10 MB would be added to the quota usage of the quota.

At block 945, the delta file table entry corresponding to the object is updated to the total quota charge for the object. In the example above, after adding the 10 additional megabytes to the quota usage of the quota, the total quota already charged for the object in the entry in the delta file table is set to 20 MB. In addition, the last object scanned is set to indicate that the scan engine has scanned the current object.

At block 950, a determination is made as to whether the current object is the last object to be scanned. If so, processing branches to block 960; otherwise, processing branches to block 955.

At block 955, the next object is selected. If an object is a directory, the next object may be a first descendant of the directory. An operating system may enumerate descendants of a directory in many ways without departing from the spirit or scope of the present invention. For example, an operating system may enumerate descendants of a directory in an alphabetical, depth first order.

The last object scanned may be used to determine whether an object has been scanned. For example, in operating system in which the object are enumerated in alphabetical order, a string comparison of a object name including its path with the last object scanned provides an indication as to whether the object has been scanned.

The actions associated with blocks 920-955 may be repeated until a directory and all of its descendants have been scanned and the quota usage of the quota updated appropriately. Furthermore, a scan engine may be instructed to recompute quota usages for more than one quota and may recompute such quota usages concurrently. At block 960, the process ends.

Figure 10:
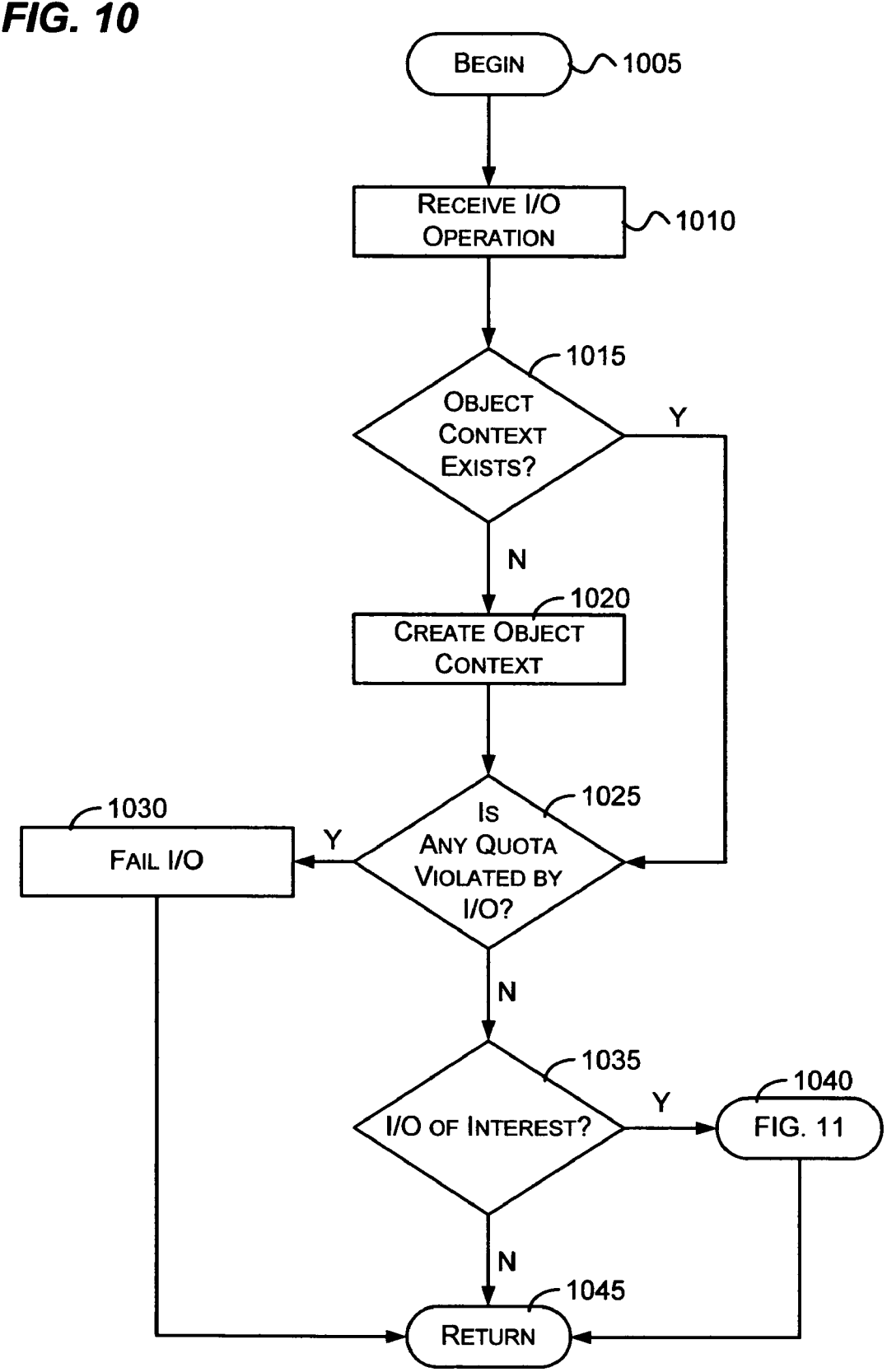
FIG. 10 is a flow diagram that generally represents actions that a quota filter may perform asynchronously from a scan engine that is scanning objects to compute a quota usage in accordance with various aspects of the invention.

FIG. 10 is a flow diagram that generally represents actions that a quota filter may perform asynchronously from a scan engine that is scanning objects to compute a quota usage in accordance with various aspects of the invention. At block 1005, the process begins.

At block 1010, an I/O operation is received. At block 1015, a determination is made as to whether an object context exists for the object involved with the I/O operation. If so, processing branches to block 1025; otherwise, processing branches to block 1020 where an object context is created. An object context is associated with an object and may comprise a blob of data into which any information may be placed. In one implementation, the object context comprises the current disk use of the object and a reference for each quota that may affect operations to the object.

At block 1025, a determination is made as to whether a violation to any quota that affects the I/O would be made if the I/O were allowed to succeed. If so, processing branches to block 1030; otherwise, processing branches to block 1035.

At block 1030, the I/O is failed. At block 1035, a determination is made as to whether the I/O is an I/O of interest. If so, processing branches to block 1040; otherwise, processing branches to block 1045. An I/O is of interest if the I/O creates, deletes, extends, shrinks, or renames an object related to a quota for which the scan engine is computing a quota usage.

Figure 11:
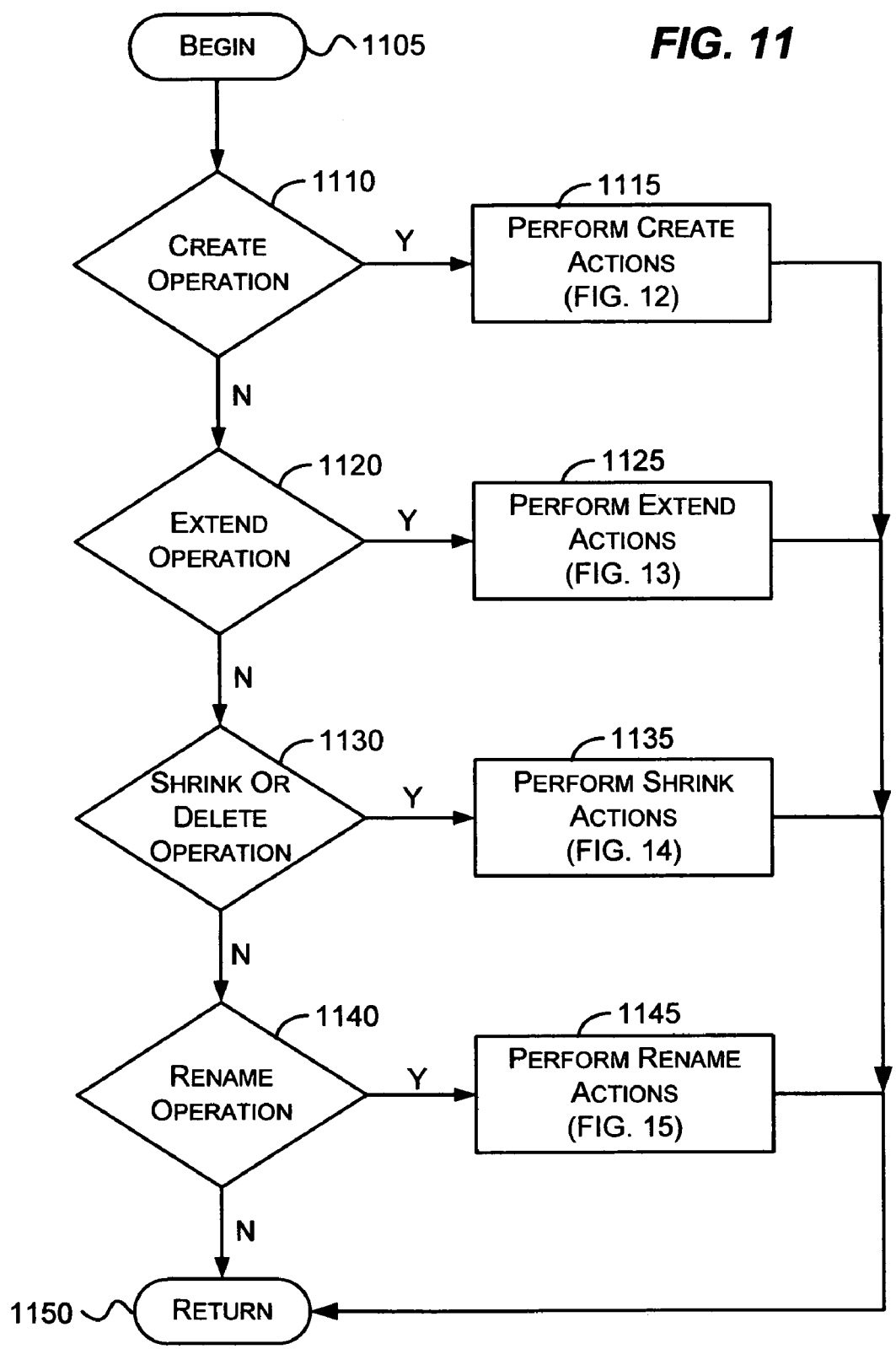
FIG. 11 is a flow diagram that generally represents actions which correspond to block 1040 of FIG. 10 that may occur in updating a quota usage after an I/O of interest is received in accordance with various aspects of the invention.

At block 1040, the actions described in conjunction with FIG. 11 are performed. At block 1045, the process returns.

FIG. 11 is a flow diagram that generally represents actions which correspond to block 1040 of FIG. 10 that may occur in updating a quota usage after an I/O of interest is received in accordance with various aspects of the invention. At block 1105, the process begins.

At block 1110, a determination is made as to whether the operation is a create operation. If so, processing branches to block 1115; otherwise, processing branches to block 1120. A create operation is an operation in which an object is created that is affected by a quota for which the scan engine is computing quota usage. At block 1115, create actions are performed as described in more detail in conjunction with FIG. 12.

At block 1120, a determination is made as to whether the operation is an extend operation. If so, processing branches to block 1125; otherwise, processing branches to block 1130. An extend operation is an operation in which an object is increased in disk size. At block 1125, extend actions are performed as described in more detail in conjunction with FIG. 13.

At block 1130, a determination is made as to whether the operation is a shrink or delete operation. If so, processing branches to block 1135; otherwise, processing branches to block 1140. A shrink operation is an operation in which an object is reduced in disk size. A delete operation is an operation in which an object is deleted from a file system. In one aspect, a delete operation may be viewed as a shrink operation in which the size of the object is shrunk to zero. At block 1135, shrink actions are performed as described in more detail in conjunction with FIG. 14.

At block 1140, a determination is made as to whether the operation is a rename operation. If so, processing branches to block 1145; otherwise, processing branches to block 1150. A rename operation is an operation in which an object is moved to another location also affected by a quota for which the scan engine is computing quota usage.

A rename operation may move an object, for example, 1) from a space unaffected by any quotas into a space affected by one or more quotas; 2) from a space affected by one or more quotas to a space unaffected by any quotas; or 3) from a space affected by a first set of quotas to a space affected by a second set of quotas. A rename operation that moves an object out of the space affected by a quota (i.e., cases 2 and 3 above) may be treated as a delete operation with respect to computing quota usage for that quota. That is, actions similar to those described in conjunction with FIG. 14 may be performed for the source quota usage whenever an object is moved from a space affected by the source quota.

When an object is renamed into a space affected by a quota (i.e., cases 1 and 3 above), actions that affect the destination quota usage may be performed as described in more detail below.

Figure 15:
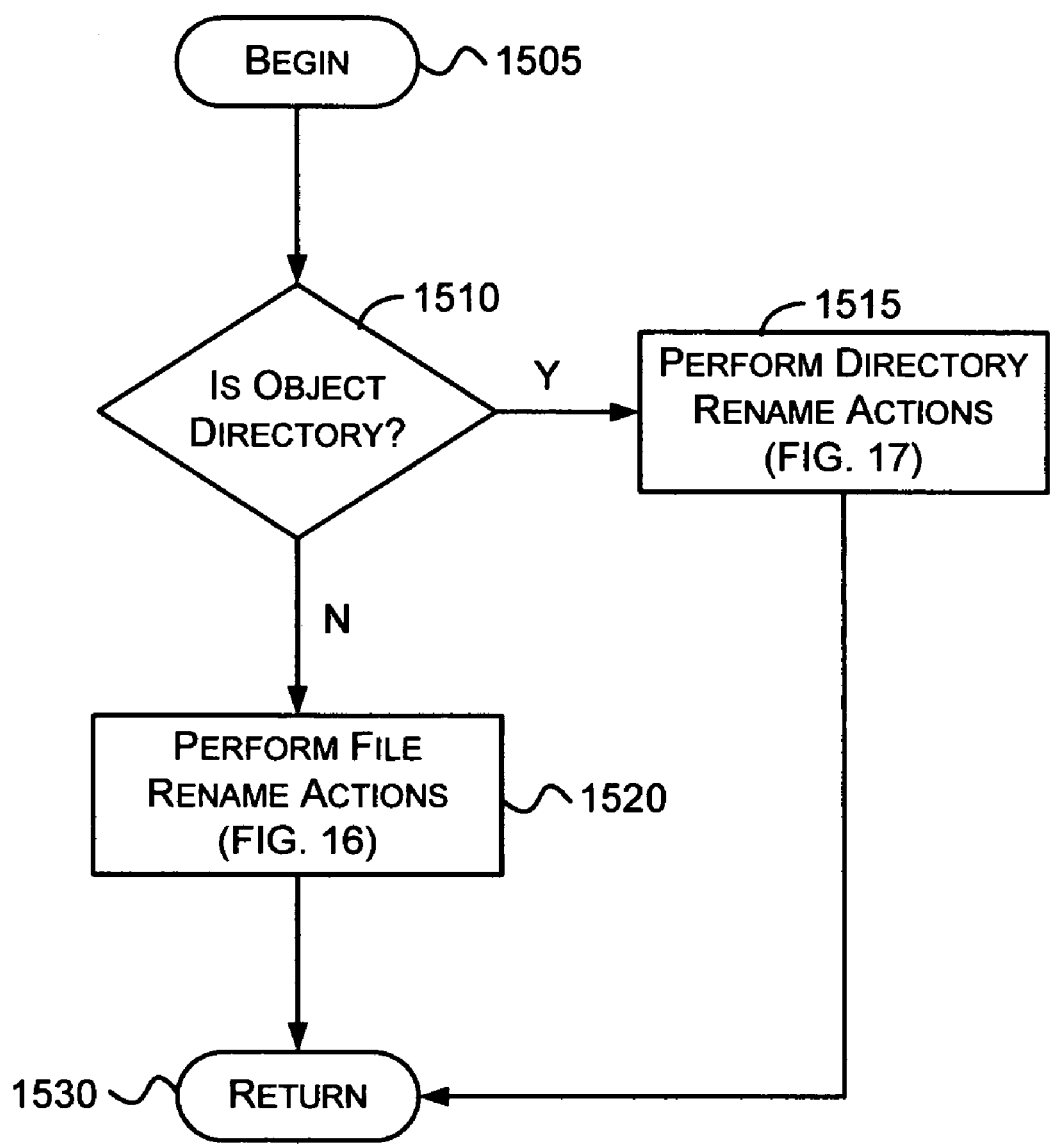
FIG. 15 is a flow diagram that generally represents actions which correspond to block 1145 of FIG. 11 that may occur when a rename I/O occurs in accordance with various aspects of the invention.

At block 1145, rename actions are performed as described in more detail in conjunction with FIG. 15.

At block 1150, the process returns.

Figure 12:
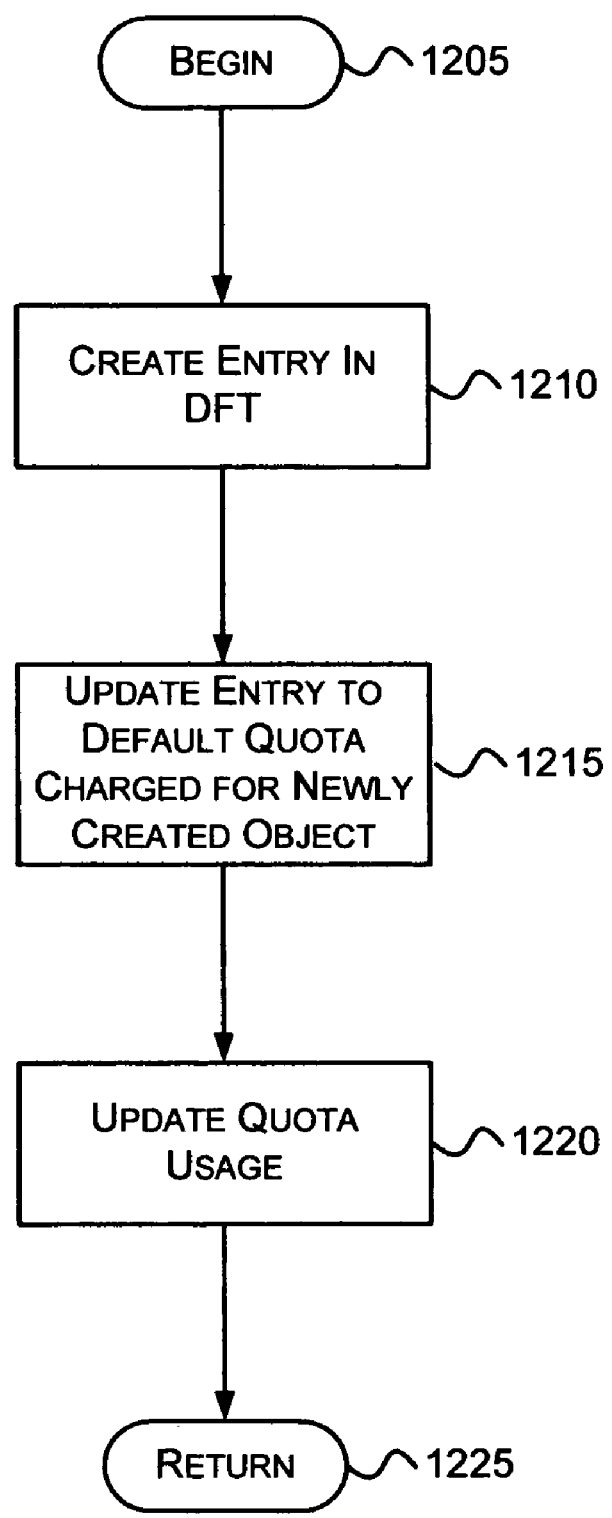
FIG. 12 is a flow diagram that generally represents actions which correspond to block 1115 of FIG. 11 that may occur when a create I/O occurs in accordance with various aspects of the invention.

FIG. 12 is a flow diagram that generally represents actions which correspond to block 1115 of FIG. 11 that may occur when a create I/O occurs in accordance with various aspects of the invention. At block 1205, the process begins.

At block 1210, an entry is created in the delta file table (DFT). The entry includes the file ID of the newly created object. At block 1215, the quota already charged for the entry is updated to a default quota charged for newly-created objects. A default quota may be charged, for example, even if an object does not include any data in it to account for overhead space consumed by creating the object. An exemplary default amount to charge is 1 kilobyte.

At block 1220, the quota usage of all associated quotas is increased by the default quota charged for the newly created object.

At block 1225, the process returns.

Figure 13:
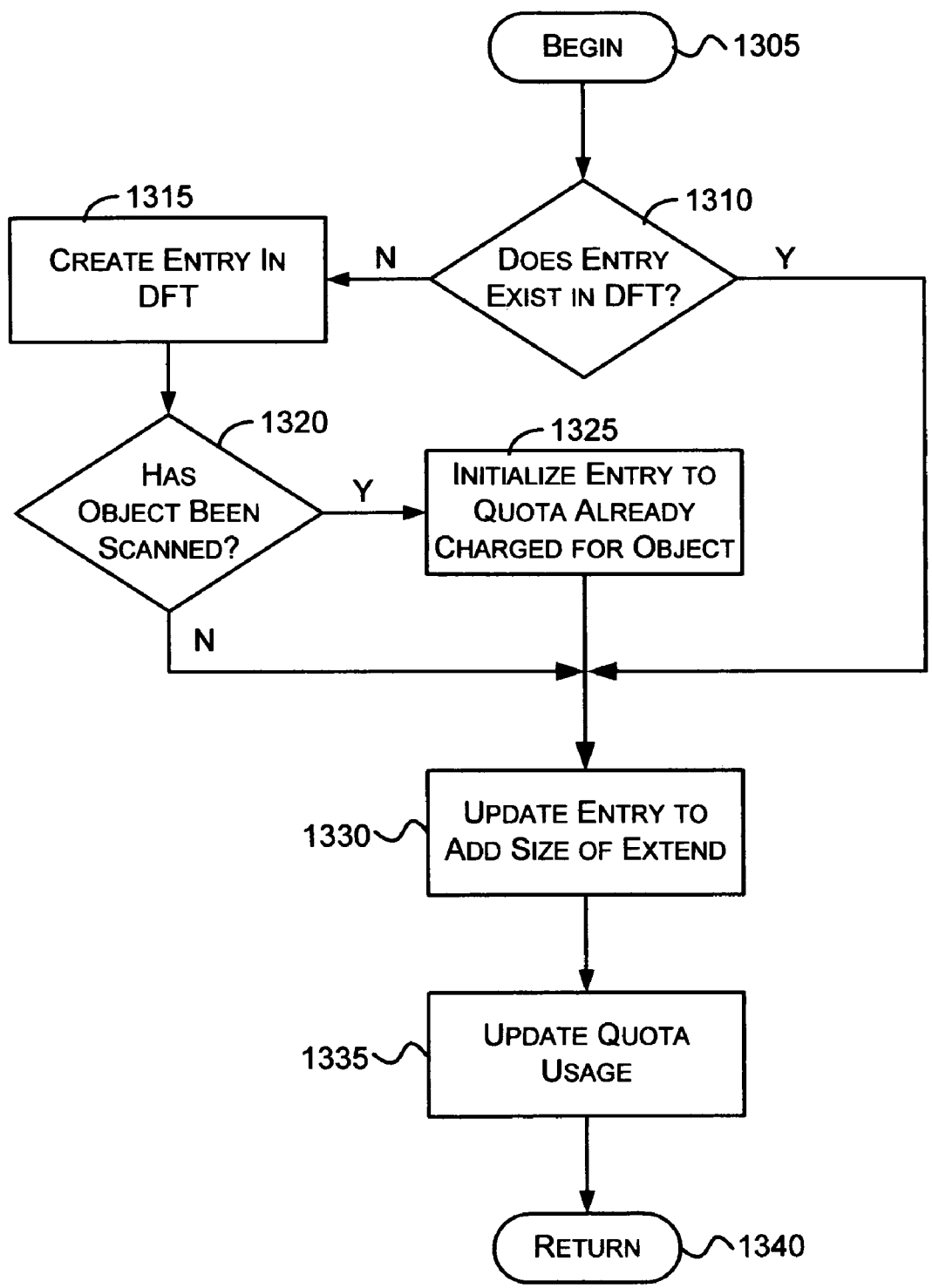
FIG. 13 is a flow diagram that generally represents actions which correspond to block 1125 of FIG. 11 that may occur when an extend I/O occurs in accordance with various aspects of the invention.

FIG. 13 is a flow diagram that generally represents actions which correspond to block 1125 of FIG. 11 that may occur when an extend I/O occurs in accordance with various aspects of the invention. At block 1305, the process begins.

At block 1310, a determination is made as to whether an entry exists in the DFT for the object. If so, processing branches to block 1330; otherwise, processing branches to block 1315. At block 1315, an entry for the object is created in the DFT. In addition, the quota already charged for the object may be initialized to zero.

At block 1320, a determination is made as to whether the object has already been scanned (and thus had its quota usage added to the quota usage of the quota). If so, processing branches to block 1325; otherwise, processing branches to block 1330. At block 1325, the entry (e.g., in the DFT) is initialized to have a quota already charged equal to the quota usage of the object. If the object has already been scanned by the scan engine, then the quota usage of the object was previously added to the quota usage of the quota. The DFT is updated to represent the quota already charged for the object.

At block 1330, the quota already charged is increased by the size of the extend. For example, if the extend extended a 10 MB object by 1 MB, then the quota already charged is changed from 10 MB to 11 MB.

At block 1335, the quota usage of the quota is also increased by the size of the extend.

At block 1340, the process returns.

Figure 14:
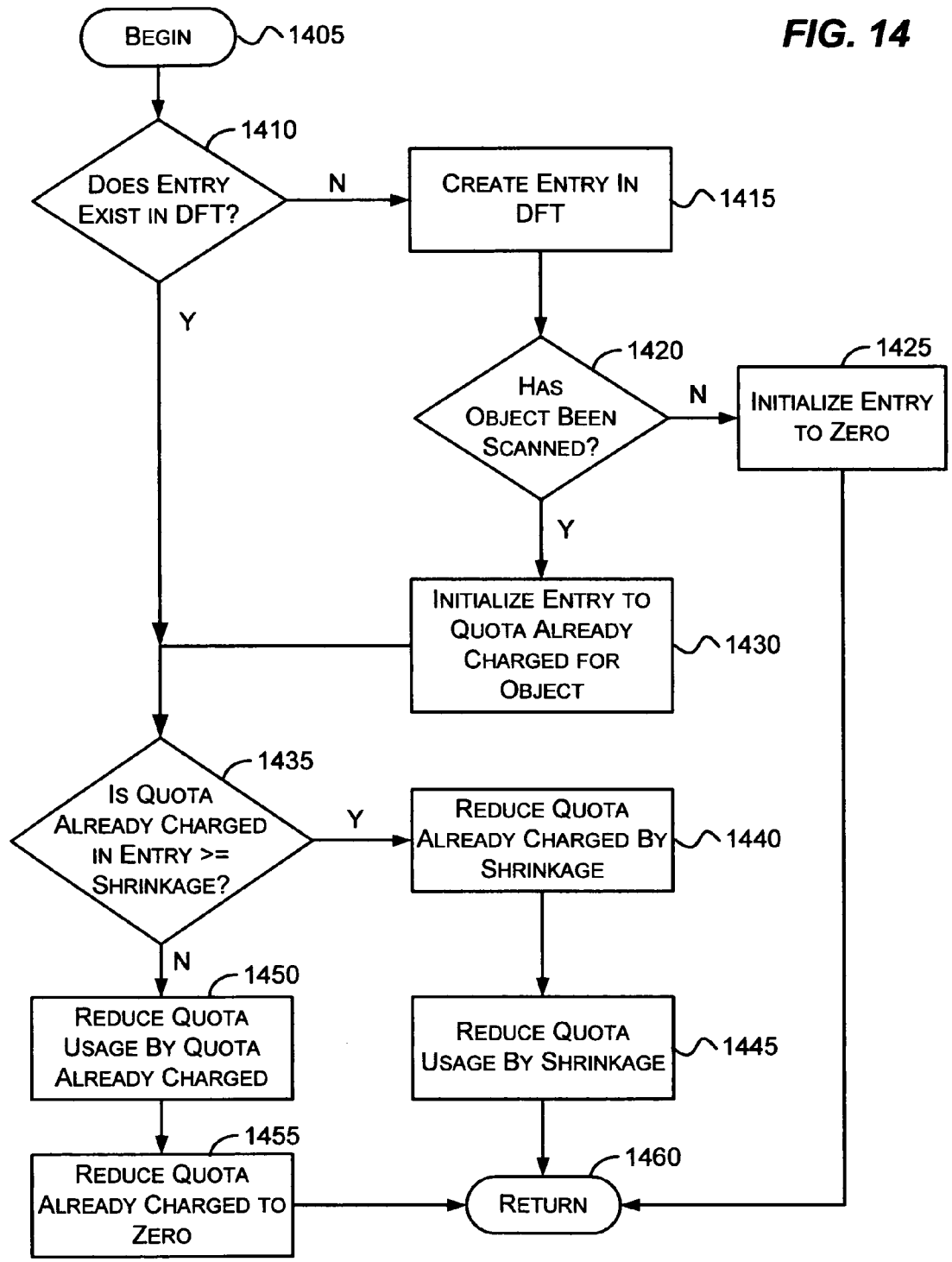
FIG. 14 is a flow diagram that generally represents actions which correspond to block 1135 of FIG. 11 that may occur when a shrink or delete I/O occurs in accordance with various aspects of the invention.

FIG. 14 is a flow diagram that generally represents actions which correspond to block 1135 of FIG. 11 that may occur when a shrink or delete I/O occurs in accordance with various aspects of the invention. At block 1405, the process begins.

At block 1410, a determination is made as to whether an entry for the object exists in the DFT. If so, processing branches to block 1435; otherwise, processing branches to block 1415. At block 1415, an entry for the object is created in the DFT.

At block 1420, a determination is made as to whether the object has already been scanned. If so, processing branches to block 1430; otherwise, processing branches to block 1425. At block 1425, the quota already charged for the object is initialized to zero. Initialization to zero may occur at block 1415, in which case, the actions associated with block 1425 may be skipped. If an object has not already been scanned, the quota used by the object will be added when the object is scanned. Thus, the quota already charged may be set to zero.

At block 1430, the quota already charged for the object is initialized to the quota usage of the object (before the shrinkage).

At block 1435, a determination is made as to whether the quota already charged is greater than or equal to the amount of shrinkage occurring on the object. If so, processing branches to block 1440; otherwise, processing branches to block 1450.

At block 1440, the quota already charged is decreased by the amount of the shrinkage. For example, if an object had a quota already charged of 10 MB and the object was shrunk by 5 MB, then the quota already charged would be reduced by 5 MB.

At block 1445, the quota usage of the quota is reduced by the amount of the shrinkage.

The actions associated with blocks 1450 and 1455 are reached if the quota already charged is less than the shrinkage. To cause quota usage to stay positive, the quota usage charged for an object should not become negative. To avoid this occurring, the test of block 1435 occurs. If the amount of shrinkage is greater than the quota already charged, then the maximum amount that the quota usage may be reduced is the quota already charged.

At block 1450, the quota usage of the quota is reduced by the quota already charged. At block 1455, the quota already charged is set to zero.

At block 1460, the process returns.

FIG. 15 is a flow diagram that generally represents actions which correspond to block 1145 of FIG. 11 that may occur when a rename I/O occurs in accordance with various aspects of the invention. At block 1505, the process begins.

At block 1510, a determination is made as to whether the rename is a rename of a directory. If so, processing branches to block 1515; otherwise, processing branches to block 1520. The branch associated with block 1510 occurs because different actions occur if the renamed object is a directory or a file. Note, that if an object is renamed out of a directory such that it no longer is subject to a quota, with respect to the quota this may be treated as if the object were deleted. To correctly adjust the quota usage of the quota, the actions associated with FIG. 14 may be performed for the object and each of its descendants, if any.

At block 1515, directory rename actions are performed as described in more detail in conjunction with FIG. 17. At block

Figure 16:
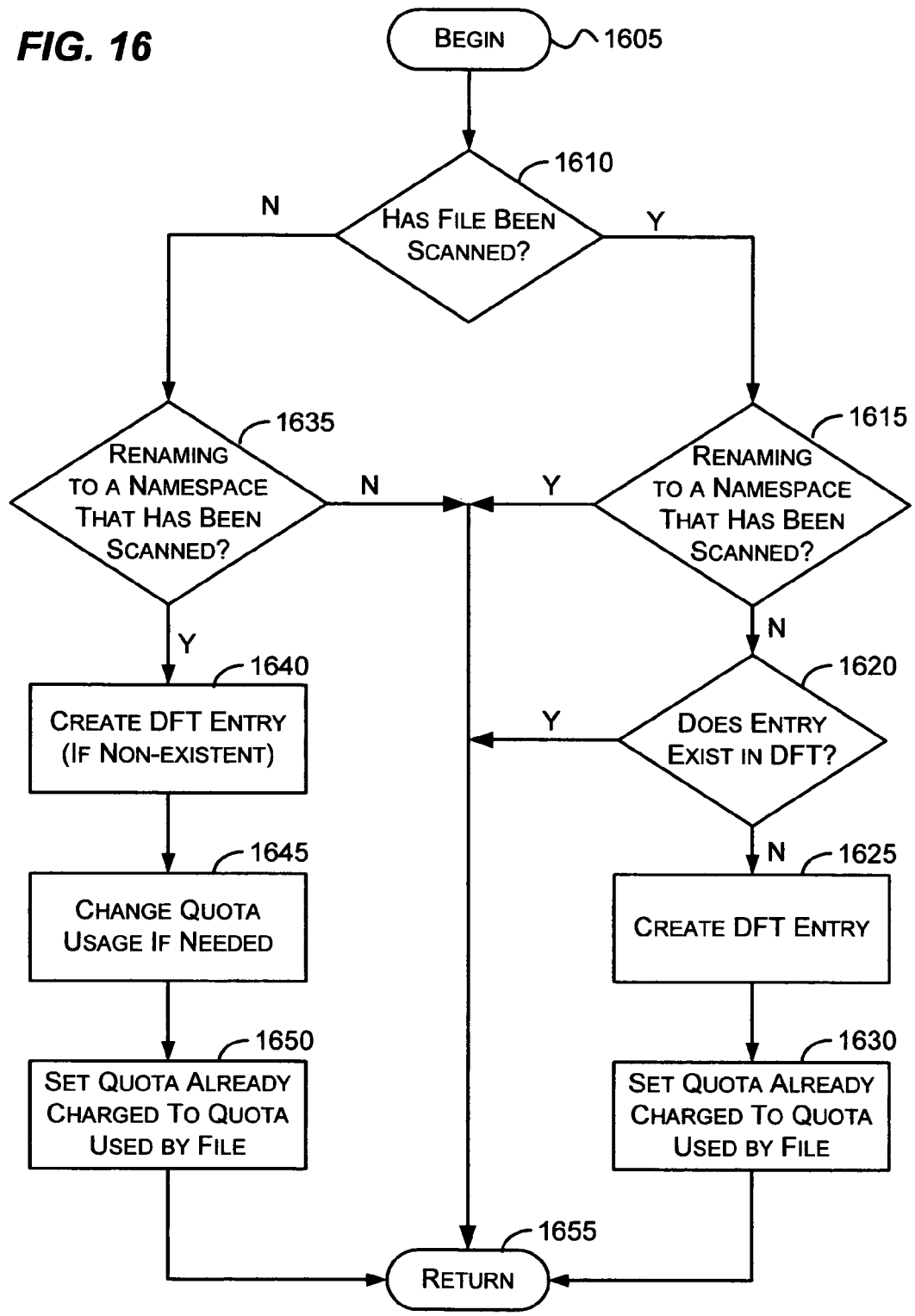
FIG. 16 is a flow diagram that generally represents actions which correspond to block 1520 of FIG. 15 that may occur when a rename I/O occurs that involves a file in accordance with various aspects of the invention.

1520, file rename actions are performed as described in more detail in conjunction with FIG. 16.

At block 1530, the process returns.

FIG. 16 is a flow diagram that generally represents actions which correspond to block 1520 of FIG. 15 that may occur when a rename I/O occurs that involves a file in accordance with various aspects of the invention. It should be noted that the actions associated with FIG. 16 relate to the quota usage of any quotas that affect the space into which the file is renamed. Although not shown in FIG. 16, if a file is renamed from a space affected by any other quotas such that the file is no longer affected by the other quotas, then the quota usage of each of the other quotas is decreased by the quota already charged for the file. In one implementation, if the file is renamed out of the space affected by a quota, the file may be treated as if the file was deleted for that quota and actions similar to those described in conjunction with FIG. 14 may be performed to adjust the quota usage of that quota.

At block 1605, the process begins. At block 1610, a determination is made as to whether the file has already been scanned. If so, processing branches to block 1615; otherwise, processing branches to block 1635.

At block 1615, a determination is made as to whether the file is being renamed to a namespace that has already been scanned. If so, processing branches to block 1655; otherwise, processing branches to block 1620. If a file that has already been scanned is being renamed to a namespace (i.e., a portion of a directory structure), that has also already been scanned, no further quota processing needs to be performed.

If, however, the file has been scanned and is moved to a namespace that has not been scanned, further actions may need to be performed as described in more detail in conjunction with blocks 1620-1630.

At block 1620, a determination is made as to whether the file has an entry in the DFT. If so, processing branches to block 1655; otherwise, processing branches to block 1625. If the file has an entry in the DFT, the entry was set to the quota usage of the file when the file was scanned. If the file was modified after being scanned, the entry was modified appropriately. Thus, in this case, no further processing needs to be done.

If an entry does not exist in the DFT, however, the entry is created in the DFT at block 1625. At block 1630, the quota already charged of the entry is changed to the quota used by the file. This avoids double-counting the usage of the file if for any reason the file is scanned again (e.g., as a result of another rename).

At block 1635, a determination is made as to whether the file (which has not been scanned yet) has been renamed to a namespace that has been scanned. If so, processing branches to block 1640; otherwise, processing branches to block 1655. At block 1640, a DFT entry is created for the file if a DFT entry does not already exist for the file.

At block 1645, the quota usage of the quota is changed if needed. If the quota already charged for the file is less than the quota usage by the file, then the quota usage is increased by the difference between the quota already charged for the file and the quota usage of the file. At block 1650, the quota already charged in the entry is changed to the quota used by the file.

At block 1655, the process returns.

FIG. 17 is a flow diagram that generally represents actions which correspond to block 1515 of FIG. 15 that may occur when a rename I/O occurs that involves a directory in accordance with various aspects of the invention. Although not shown in FIG. 17, if a directory is renamed from a space affected by any other quotas such that the file is no longer affected by the other quotas, then the quota usage of each of the other quotas is decreased by the quota already charged for the directory. In one implementation, if the directory is renamed out of the space affected by a quota, the directory may be treated as if the directory was deleted for that quota and actions similar to those described in conjunction with FIG. 14 may be performed to adjust the quota usage of that quota.

At block 1705, the process begins.

At block 1710, a determination is made as to whether the directory has been scanned. If so, processing branches to block 1735; otherwise, processing branches to block 1715. At block 1715, a determination is made as to whether the directory has been renamed to a namespace that has been scanned. If so, processing branches to block 1720; otherwise, processing branches to block 1750.

At block 1720, a DFT entry is created for the directory (if it does not exist). At block 1725, a skip flag is set in the entry to indicate that the directory should be skipped if the scan engine encounters it. At block 1730, the quota usage of the quota is increased by the space consumed by the directory and its descendants. The space consumed by the directory and its descendants may occur before completing the rename operation.

At block 1735, a determination is made as to whether the directory has been renamed to a namespace that has been scanned. If so, processing branches to block 1750; otherwise, processing branches to block 1740. At block 1740, a DFT entry is created for the directory (if a DFT entry for the directory does not exist). At block 1745, a skip flag is set in the DFT entry to indicate that the directory should be skipped if encountered in a scan again (e.g., via another rename or otherwise).

At block 1750, the process returns.

As can be seen from the foregoing detailed description, there is provided a method and system for computing quota usage. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions which, when executed, perform a method, comprising:

performing a calculation of a total of disk space consumed by objects;

monitoring changes to the objects while performing the calculation;

changing the calculation if any of the changes to the objects affects the disk space consumed by the objects, wherein changing the calculation comprises adding an entry to a data structure, wherein the entry identifies an object that has changed and includes a value indicating how much of the disk space consumed by the object is accounted for in the total;

scanning the object and determining a difference between the value and the disk space consumed by the object; and a filter determining whether a violation of a quota would be made by the changes to the objects.

2. The computer-readable storage medium of claim 1, wherein the objects comprise a directory and its descendants.

3. The computer-readable storage medium of claim 1, wherein the changes comprise an extend to one or more of the objects.

4. The computer-readable storage medium of claim 1, wherein the changes comprise a shrinkage to one or more of the objects.

5. The computer-readable storage medium of claim 1, wherein the changes comprise a deletion of one or more of the objects.

6. The computer-readable storage medium of claim 1, wherein the changes comprise a renaming of one or more of the objects.

7. The computer-readable storage medium of claim 1, wherein the changes comprise adding a descendant to one or more of the objects.

8. The computer-readable storage medium of claim 1, wherein changing the calculation comprises adding an entry to a data structure, wherein the entry identifies an object that has changed and includes a value indicating how much of the disk space consumed by the object is accounted for in the total.

9. The computer-readable storage medium of claim 1, further comprising indicating that an object is to be skipped if scanned.

10. The computer-readable storage medium of claim 1, further comprising indicating the last object that is accounted for in the total.

11. A computer-readable storage medium having computer-executable instructions which, when executed, perform a method, comprising:
performing a calculation of a total of disk space consumed by objects;
monitoring changes to the objects while performing the calculation;
changing the calculation if any of the changes to the objects affects the disk space consumed by the objects,
wherein changing the calculation comprises adding an entry to a data structure, wherein the entry identifies an object that has changed and includes a value indicating how much of the disk space consumed by the object is accounted for in the total; and
scanning the object and adding a difference between the value and the disk space consumed by the object to the total.

12. A computer-readable storage medium having computer-executable instructions which, when executed, perform a method, comprising:
performing a calculation of a total of disk space consumed by objects;
monitoring changes to the objects while performing the calculation; and
changing the calculation if any of the changes to the objects affects the disk space consumed by the objects,
wherein changing the calculation comprises adding an entry to a data structure, wherein the entry identifies an object that has changed and includes a value indicating how much of the disk space consumed by the object is accounted for in the total, and
wherein the changes comprise a shrinkage to the object and further comprising reducing the value by the shrinkage if the shrinkage is less than the value.

13. A computer-readable storage medium having computer-executable instructions which, when executed, perform a method, comprising:
performing a calculation of a total of disk space consumed by objects;
monitoring changes to the objects while performing the calculation; and
changing the calculation if any of the changes to the objects affects the disk space consumed by the objects,
wherein changing the calculation comprises adding an entry to a data structure, wherein the entry identifies an object that has changed and includes a value indicating how much of the disk space consumed by the object is accounted for in the total, and
wherein the changes comprise a shrinkage to the object and further comprising reducing the value to zero if the shrinkage is greater than or equal to the value.

14. In a computing environment, a method, comprising:
scanning an object to determine storage consumed by the object,
wherein scanning an object to determine storage consumed by the object occurs concurrently with monitoring changes to any of a plurality of objects determining whether all of the storage consumed by the object is charged to a quota usage;
when all of the storage consumed by the object is not charged to the quota usage, adding what has not been charged to the quota usage; and
updating a data structure that indicates quota already charged to the quota usage for each object that changed after scanning began,
wherein the data structure comprises a table having entries, and wherein each entry of the table comprises an identifier that identifies a changed object and an amount of quota already charged for the object to the quota usage.

15. The method of claim 14, wherein the object comprises a directory or a file.

16. The method of claim 14, further comprising renaming another object associated with the quota usage to a namespace concurrently with scanning the object to determine storage consumed by the object.

17. In a computing environment, a method, comprising:
scanning an object to determine storage consumed by the object, wherein scanning an object to determine storage consumed by the object occurs concurrently with monitoring changes to any of a plurality of objects;
determining whether all of the storage consumed by the object is charged to a quota usage;
when all of the storage consumed by the object is not charged to the quota usage, adding what has not been charged to the quota usage; and
updating a data structure that indicates quota already charged to the quota usage for each object that changed after scanning began,
wherein the data structure comprises a table having entries, and wherein an entry in the table comprises an identifier that identifies a changed object and a flag that indicates that the changed object is to be skipped if subsequently scanned.

18. In a computing environment, a method, comprising:
scanning an object to determine storage consumed by the object;
determining whether all of the storage consumed by the object is charged to a quota usage;
when all of the storage consumed by the object is not charged to the quota usage, adding what has not been charged to the quota usage; and
renaming another object associated with the quota usage to a namespace concurrently with scanning the object to determine storage consumed by the object, wherein the another object has already been scanned and further comprising setting a skip flag to indicate that the object is to be skipped if subsequently scanned.

19. The method of claim 18, wherein the object comprises a directory.

20. The method of claim 18, wherein the other object has not been scanned, wherein objects in the namespace have been scanned, and further comprising increasing the quota usage by storage consumed by the other object.

21. The method of claim 18, wherein the other object has not been scanned, wherein objects in the namespace have been scanned, and further comprising creating an entry in a table to indicate that space consumed by the other object is charged to the quota usage.

22. The method of claim 21, further comprising charging space consumed for all descendants of the other object to the quota usage.

23. The method of claim 22, further comprising indicating that the object is to be skipped if subsequently scanned.

24. An apparatus for computing quota usage comprising one or more computer processors and computer-readable storage media upon which is encoded computer-executable instructions for performing a method comprising:

performing a calculation of a total of disk space consumed by objects;

monitoring changes to the objects while performing the calculation;

changing the calculation if any of the changes to the objects affects the disk space consumed by the objects, wherein changing the calculation comprises adding an entry to a data structure, wherein the entry identifies an object that has changed and includes a value indicating how much of the disk space consumed by the object is accounted for in the total; and scanning the object and adding a difference between the value and the disk space consumed by the object to the total.

25. The apparatus of claim 24, wherein scanning and monitoring are performed asynchronously.

26. The apparatus of claim 24, wherein scanning and monitoring are performed concurrently.

27. The apparatus of claim 24, wherein scanning further comprises examining the data structure to determine if the data structure includes an entry for an object before charging the quota usage for disk space consumed by the object.

28. The apparatus of claim 24, wherein the method further comprises a filter determining violation of a quota.

* * * * *